United States Patent
Ash et al.

(10) Patent No.: US 10,628,331 B2
(45) Date of Patent: Apr. 21, 2020

(54) DEMOTE SCAN PROCESSING TO DEMOTE TRACKS FROM CACHE

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US); Sonny E. Williams, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 235 days.

(21) Appl. No.: 15/170,835

(22) Filed: Jun. 1, 2016

(65) Prior Publication Data
US 2017/0351619 A1 Dec. 7, 2017

(51) Int. Cl.
- *G06F 12/126* (2016.01)
- *G06F 12/123* (2016.01)
- *G06F 12/0804* (2016.01)

(52) U.S. Cl.
CPC ........ *G06F 12/126* (2013.01); *G06F 12/0804* (2013.01); *G06F 12/123* (2013.01); *G06F 2212/1044* (2013.01); *G06F 2212/281* (2013.01)

(58) Field of Classification Search
CPC ............ G06F 12/126; G06F 12/123; G06F 2212/1044; G06F 2212/281; G06F 2212/69
See application file for complete search history.

(56) References Cited

U.S. PATENT DOCUMENTS

| | | | | |
|---|---|---|---|---|
| 5,542,066 A | * | 7/1996 | Mattson | G06F 12/0804 711/113 |
| 6,141,731 A | * | 10/2000 | Beardsley | G06F 12/123 711/133 |
| 6,327,644 B1 | * | 12/2001 | Beardsley | G06F 12/123 711/113 |
| 6,529,995 B1 | * | 3/2003 | Shepherd | G06F 11/1435 707/999.202 |
| 7,680,982 B2 | | 3/2010 | Ash et al. | |
| 8,819,343 B2 | * | 8/2014 | Benhase | G06F 12/126 711/135 |
| 2003/0084248 A1 | * | 5/2003 | Gaither | G06F 12/0804 711/133 |
| 2003/0093647 A1 | * | 5/2003 | Mogi | G06F 17/3048 712/1 |

(Continued)

*Primary Examiner* — Mano Padmanabhan
*Assistant Examiner* — Andrew J Cheong
(74) *Attorney, Agent, or Firm* — David W. Victor; Konrad Raynes Davda & Victor LLP

(57) ABSTRACT

Provided are a computer program product, system, and method demote scan processing to demote tracks from cache. Tracks in the storage stored in the cache are indicated in a cache list. The cache list is scanned to determine unmodified tracks to initiate to demote. In response to processing an indicated modified track in the cache list while scanning the cache list, a destage is initiated for the processed indicated modified track and continuing to scan the cache list to determine unmodified tracks. In response to processing a number of modified tracks indicted in the cache list, a determination is made of an unmodified track in the cache list and continuing to scan, from the determined unmodified track, for unmodified tracks to initiate to demote.

15 Claims, 5 Drawing Sheets

(56) References Cited

U.S. PATENT DOCUMENTS

| | | | | |
|---|---|---|---|---|
| 2003/0093775 A1* | 5/2003 | Hilton | G06F 9/45504 | 717/138 |
| 2003/0105928 A1* | 6/2003 | Ash | G06F 12/0804 | 711/136 |
| 2003/0149843 A1* | 8/2003 | Jarvis | G06F 12/123 | 711/133 |
| 2005/0080994 A1* | 4/2005 | Cohen | G06F 1/3225 | 711/118 |
| 2007/0118695 A1* | 5/2007 | Lowe | G06F 12/123 | 711/136 |
| 2008/0040553 A1* | 2/2008 | Ash | G06F 11/1076 | 711/133 |
| 2008/0155190 A1* | 6/2008 | Ash | G06F 12/0871 | 711/114 |
| 2010/0174676 A1* | 7/2010 | Ash | G06F 11/1441 | 707/609 |
| 2011/0191534 A1* | 8/2011 | Ash | G06F 12/0804 | 711/113 |
| 2012/0303904 A1* | 11/2012 | Ash | G06F 12/0871 | 711/136 |
| 2013/0132664 A1* | 5/2013 | Benhase | G11B 21/025 | 711/112 |
| 2013/0185504 A1* | 7/2013 | Ash | G06F 12/128 | 711/114 |
| 2013/0185514 A1* | 7/2013 | Benhase | G06F 12/123 | 711/136 |
| 2014/0082294 A1* | 3/2014 | Ash | G06F 12/12 | 711/133 |
| 2015/0058561 A1* | 2/2015 | Ash | G06F 3/0641 | 711/114 |
| 2015/0134914 A1* | 5/2015 | Ash | G06F 12/0891 | 711/136 |
| 2015/0261453 A1* | 9/2015 | Ash | G06F 3/0619 | 711/114 |
| 2016/0321190 A1* | 11/2016 | Ash | G06F 12/0868 | |
| 2017/0052822 A1* | 2/2017 | Ash | G06F 9/5016 | |
| 2017/0052897 A1* | 2/2017 | Ash | G06F 12/0891 | |
| 2017/0052898 A1* | 2/2017 | Ash | G06F 12/0893 | |
| 2017/0052902 A1* | 2/2017 | Ash | G06F 12/123 | |
| 2017/0091106 A1* | 3/2017 | Ash | G06F 12/0866 | |
| 2017/0091109 A1* | 3/2017 | Ash | G06F 12/0891 | |
| 2017/0091110 A1* | 3/2017 | Ash | G06F 12/0891 | |
| 2017/0111468 A1* | 4/2017 | Ash | H04L 67/2852 | |
| 2017/0124001 A1* | 5/2017 | Ash | G06F 12/128 | |
| 2017/0139841 A1* | 5/2017 | Ash | G06F 12/123 | |

* cited by examiner

Cache Control Block

Cache Information

DEMOTE SCAN PROCESSING TO DEMOTE TRACKS FROM CACHE

BACKGROUND OF THE INVENTION

1. Field of the Invention

The present invention relates to a computer program product, system, and method for demote scan processing to demote tracks from cache.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU cache list for the accessed track is moved to a Most Recently Used (MRU) end of the list. If the requested track is not in the cache, i.e., a cache miss, then the track in the cache whose entry is at the LRU end of the list may be removed and demoted and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

To avoid the cache from becoming full, tracks need to be demoted, i.e., removed from cache or invalidated in cache, to make room for newly accessed tracks. The active LRU cache list is scanned to determine unmodified tracks to move to a demote ready LRU list from where they will be demoted, i.e., removed. If the demote scan operation encounters modified tracks, the demote scan initiates a destaging operation of the modified track, and skips the modified track to process further tracks on the active LRU cache list. A destage operation writes the modified track to the storage while leaving the track in the cache. If a cache has a high percentage of modified tracks, then the demote scan may take a long time processing entries to locate unmodified tracks that can be demoted. This delay in locating unmodified tracks can result in performance problems if space cannot be freed in the cache through demotion of tracks.

There is a need in the art for improved techniques for selecting tracks for demotion from the cache.

SUMMARY

Provided are a computer program product, system, and method demote scan processing to demote tracks from cache. Tracks in the storage stored in the cache are indicated in a cache list. The cache list is scanned to determine unmodified tracks to initiate to demote. In response to processing an indicated modified track in the cache list while scanning the cache list, a destage is initiated for the processed indicated modified track and continuing to scan the cache list to determine unmodified tracks. In response to processing a number of modified tracks indicated in the cache list, a determination is made of an unmodified track in the cache list and continuing to scan, from the determined unmodified track, for unmodified tracks to initiate to demote.

DETAILED DESCRIPTION

During cache operations, the cache may have mostly modified tracks over unmodified tracks. For instance, a cache fast write (CFW) operation writes modified tracks to the cache without making a copy of the track in a non-volatile storage unit. Prior art demote scan processes may scan through numerous modified tracks, such as CFW tracks, which are not eligible for the demote ready list to demote before reaching an unmodified track. To improve the process of locating unmodified tracks in the active LRU cache list to demote, described embodiments provide techniques for a demote scan task to determine an unmodified track in the cache list and continuing to scan for unmodified tracks to initiate to demote from the determined unmodified track. This improves demote scan processing because after processing a certain number of modified tracks, the demote scan task will jump to a known unmodified track from which tracks can be demoted. The determined unmodified track may comprise a destaged track that the demote scan task previously initiated to destage in response to processing a modified track during the demote scan operation.

Figure 1:
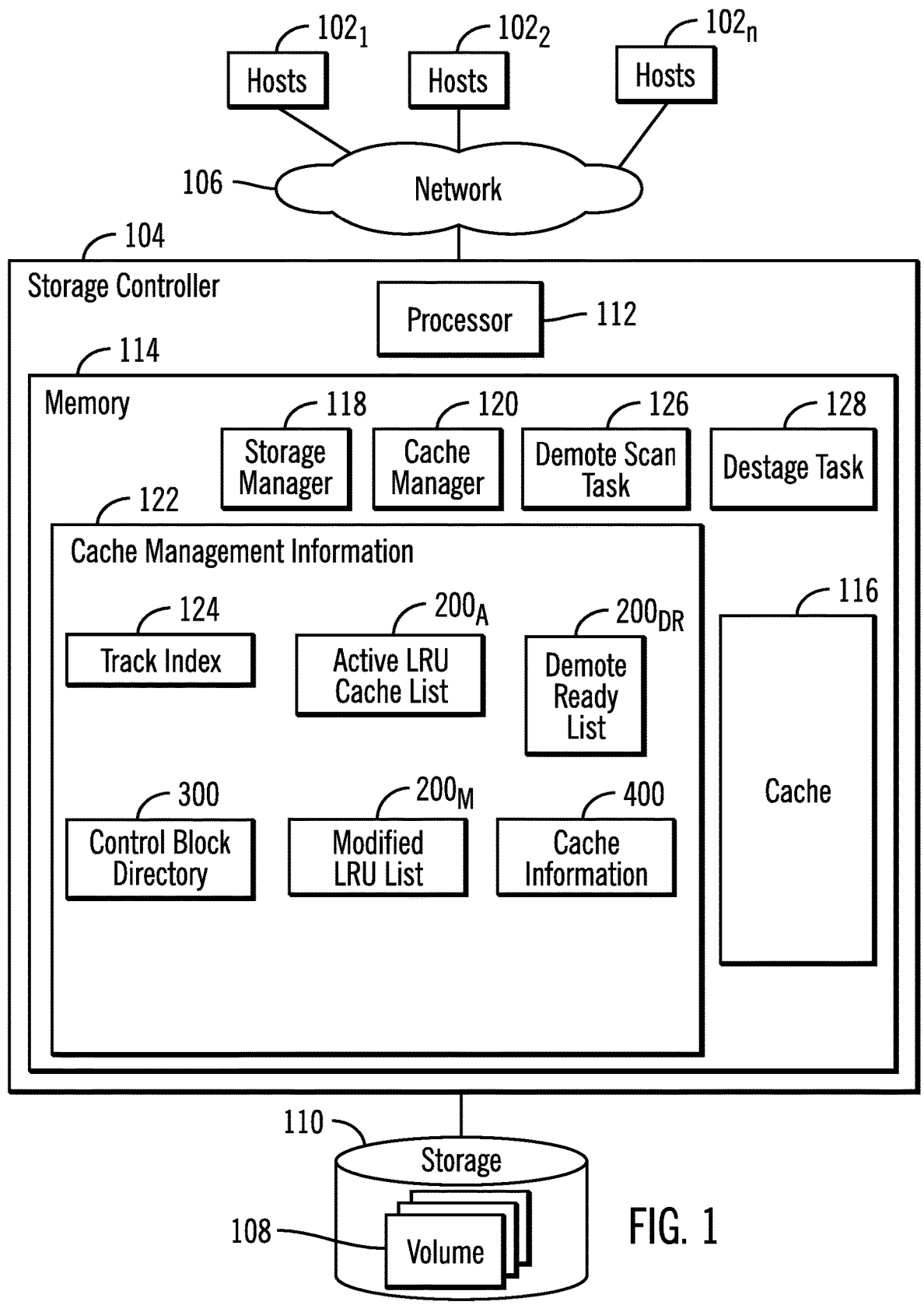
FIG. 1 illustrates an embodiment of a computing environment.

FIG. 1 illustrates an embodiment of a computing environment. A plurality of hosts $102_1, 102_2 \ldots 102_n$ may submit Input/Output (I/O) requests to a storage controller 104 over a network 106 to access data at volumes 108 (e.g., Logical Unit Numbers, Logical Devices, Logical Subsystems, etc.) in a storage 110. The storage controller 104 includes one or more processors 112 and a memory 114, including a cache 116 to cache data for the storage 110. The processor 112 may comprise a separate central processing unit (CPU), one or a group of multiple cores on a single CPU, or a group of processing resources on one or more CPUs. The cache 116 buffers data transferred between the hosts $102_1, 102_2 \ldots 102_n$, and volumes 108 in the storage 110.

The memory 114 further includes a storage manager 118 for managing the transfer of tracks transferred between the hosts $102_1, 102_2 \ldots 102_n$ and the storage 110 and a cache manager 120 that manages data transferred between the hosts $102_1, 102_2 \ldots 102_n$ and the storage 110 in the cache 116. A track may comprise any unit of data configured in the storage 110, such as a track, Logical Block Address (LBA), storage cell, group of cells (e.g., column, row or array of cells), sector, segment, etc., which may be part of a larger grouping of tracks, such as a volume, logical device, etc.

The cache manager 120 maintains cache management information 122 in the memory 114 to manage read (unmodified) and write (modified) tracks in the cache 116. The cache management information 122 may include a track index 124 providing an index of tracks in the cache 116 to cache control blocks in a control block directory 300, an active Least Recently Used (LRU) cache list $200_A$ indicating active modified and unmodified tracks in the cache 116; a demote ready LRU list $200_{DR}$ indicating a plurality of unmodified tracks that are ready to be demoted from the cache 116; and a modified LRU list $200_M$ having modified tracks to destage to the storage 110. The control block directory 300 includes the cache control blocks, where there is one cache control block for each track in the cache 116 providing metadata on the track in the cache 116. The track index 124 associates tracks with the cache control blocks providing information on the tracks in the cache.

In embodiments where the storage 110 is configured with multiple Redundant Array of Independent Disks (RAID) array ranks, there may be multiple modified LRU lists $200_M$, one for each of the RAID ranks. In this way, tracks in a same RAID rank can be destaged together in strides of the RAID rank. A stride is a unit in a RAID rank for which parity information is calculated according to a RAID level algorithm, and the tracks in the stride are striped across the data storage devices in the RAID rank.

The processor 112 executes a demote scan task 126 to scan the active LRU cache list $200_A$ to determine unmodified tracks to add to the demote ready LRU list $200_{DR}$ and executes a destage task 128 to destage a modified track indicated in the modified LRU list $200_M$. The demote scan task 126 may be executed with the destage task 128 so that modified tracks in the active LRU cache list $200_A$ are destaged while the active LRU cache list $200_A$ is scanned for unmodified tracks to demote.

The storage manager 118, cache manager 120, demote scan task 126, and destage task 128 are shown in FIG. 1 as program code loaded into the memory 114 and executed by one or more of the processors 112. Alternatively, some or all of the functions may be implemented as microcode or firmware in hardware devices in the storage controller 104, such as in Application Specific Integrated Circuits (ASICs).

The storage 110 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts $102_1, 102_2 \ldots 102_n$ may connect to the storage controller 104 over a bus interface, such as a Peripheral Component Interconnect (PCI) bus interface and other interfaces known in the art.

Figure 2:
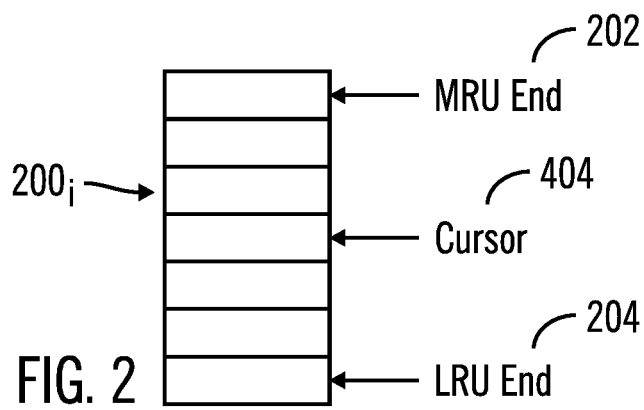
FIG. 2 illustrates an embodiment of a Least Recently Used (LRU) list.

FIG. 2 illustrates an embodiment of the lists $200_A$, $200_{DR}$, and $200_M$ each as a Least Recently Used (LRU) list 200, having a most recently used (MRU) end 202 identifying a track most recently added to the cache 116 or most recently accessed in the cache 116 and a least recently used (LRU) end 204 from which the track identified at the LRU end 204 is selected to demote from the cache 116. The LRU end 204 points to a track identifier, such as a track identifier address or a cache control block index for the track, of the track that has been in the cache 116 the longest for tracks indicated in that list $200_A$, $200_{DR}$. As a track is added to the MRU end 202, other tracks move downward toward the LRU end 204. If there is not sufficient space for the track being added to the MRU end 202, then a track may be demoted from the LRU end 204 to make room for the new track being added. The active LRU cache list $200_A$ further includes a cursor 404 that points to a last destaged track from which the demote scan task 126 can start demoting unmodified tracks.

Figure 3:
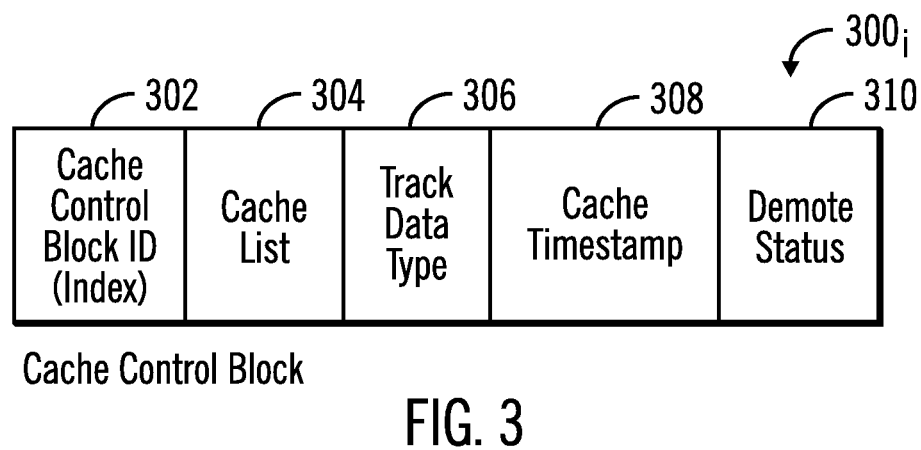
FIG. 3 illustrates an embodiment of a cache control block.

FIG. 3 illustrates an embodiment of an instance of a cache control block $300_i$ for one of the tracks in the cache 116, including, but not limited to, a cache control block identifier 302, such as an index value of the cache control block $300_i$; the LRU list 304, e.g., one of LRU lists $200_A$, $200_{DR}$, $200_M$ in which the track associated cache control block $300_i$ is indicated; a track data type 306, such as modified, unmodified, etc.; a cache timestamp 308 indicating a time the track was added to the cache 116; a demote status 310 indicating whether the track identified by the cache control block $300_i$ is to be demoted from the cache 116 and indicated in the demote ready LRU list $200_{DR}$. The cache list 304 may indicate both the active LRU cache list $200_A$ and the modified LRU list $200_M$ for a modified track in active LRU cache list $200_A$ that is selected for destaging.

In certain embodiments, the cache timestamp 308 may be set to a sequence number that that is periodically incremented, such as at every clock cycle or couple of milliseconds. When the track is added to the cache 116, the timestamp 308 is set to the current value for the sequence number.

Figure 4:
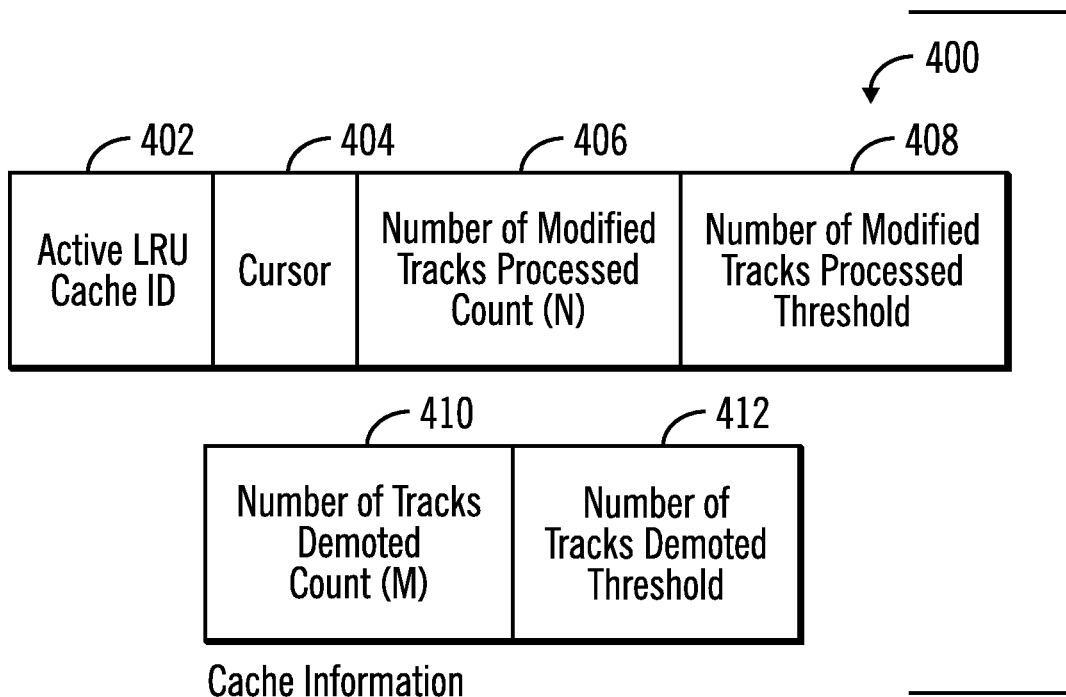
FIG. 4 illustrates an embodiment of cache information.

FIG. 4 illustrates an embodiment of cache information 400, maintained for the active LRU cache list $200_A$ of parameters used to manage tracks in the cache 116, including, but not limited to, a cache list identifier (ID) 402; cursor 404, also shown in FIG. 2, indicating a start of a region of unmodified tracks to which the demote scan task 126 can skip if too many modified tracks are processed during a demote scan task 126; a number of modified tracks processed count (N) 406 indicating a number of modified tracks sequentially processed by the demote scan task 126; a number of modified tracks threshold 408 indicating a threshold number of modified tracks the demote scan task 126 processes before skipping to the cursor 404; a number of tracks demoted count (M) 410 indicating a number of unmodified tracks that the demote scan task 126 has moved from the active LRU cache list $200_A$ to the demote ready LRU list $200_{DR}$ during the current demote scan process; and a number of tracks demoted threshold 412 indicating a maximum number of unmodified tracks processed to be demoted to cause the demote scan task 126 to end the current demote scan. The number of modified tracks processed threshold 408 may be set to a value based on threshold at which further delays in processing unmodified tracks could result in performance delays to the application accessing the task if tracks cannot be demoted fast enough to keep up with host processing.

Figure 5:
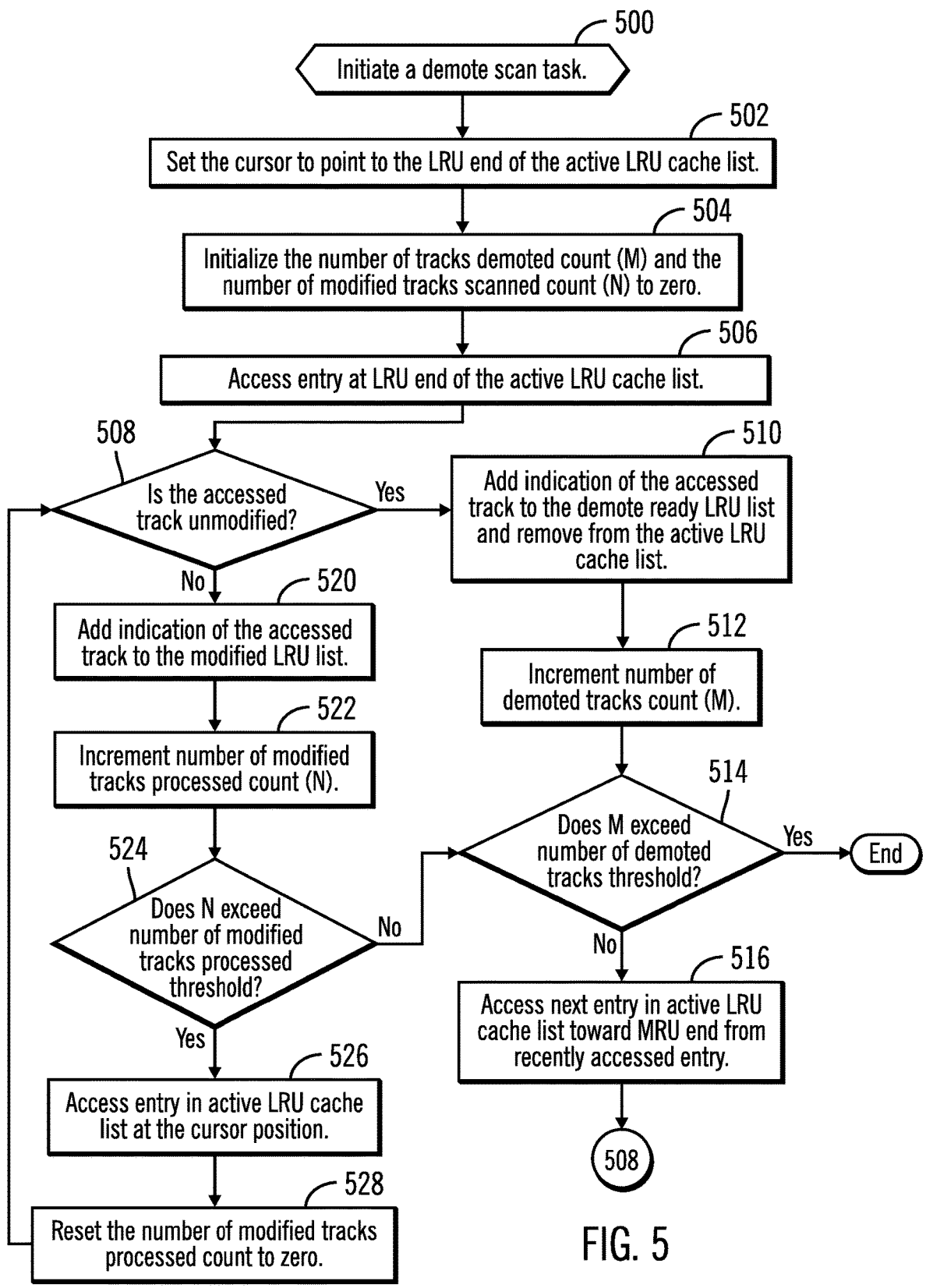
FIG. 5 illustrates an embodiment of operations of a demote scan task.

FIG. 5 illustrates an embodiment of operations performed by the demote scan task 126 executed by the processor 112 to perform a demote scan of the active LRU cache list $200_A$. Upon initiating (at block 500) the demote scan, the demote scan task 126 sets (at block 502) the cursor 404 to point to the LRU end 204 of the active LRU cache list $200_A$ and initializes (at block 504) the number of tracks demoted count (M) 410 and the number of modified tracks scanned count (N) 412 to zero. The track entry at the LRU end 204 of the active LRU cache list $200_A$ is accessed at block 506) to start the demote scan processing. If (at block 508) the accessed track is unmodified, then the demote scan task 126 adds (at block 510) the indication of the accessed track to the demote ready LRU list $200_{DR}$ and removes the entry for the accessed track from the active LRU cache list $200_A$. Further, the demote status 310 in the cache control block $300_i$ may be updated to indicate the track is ready for demotion in the demote ready LRU list $200_{DR}$. The number of demoted tracks count (M) 410 is incremented (at block 512). If (at block 514) M 410 exceeds the number of demoted tracks threshold 412, then control ends as the maximum number of unmodified tracks have been added to the demote ready LRU list $200_{DR}$ during the current demote scan. If (at block 514) the threshold number 412 of unmodified tracks have not been added to the demote ready LRU list $200_{DR}$, then the next entry in the active LRU cache list $200_A$ toward the MRU end 202 from the recently accessed entry is accessed (at block 516) and control proceeds to block 508 to process that accessed track.

If (at block 508) the accessed track is modified, then the demote scan task 126 adds (at block 520) indication of the accessed track to the modified LRU list $200_M$ from where it can be processed for destaging. The number of modified tracks processed (N) count 406 is incremented (at block 522). If (at block 524) N exceeds the number of modified tracks processed threshold 408, then the demote scan task 126 accesses (at block 526) the entry in the active LRU cache list $200_A$ at the cursor 404 position, i.e., addressed by the cursor 404, which is the start of a region of unmodified tracks. The number of modified tracks processed count (N) 406 is reset to zero and control proceeds back to block 508 to process the track accessed at the cursor 404. If (at block 524) the number of modified racks processed count (N) 406 does not exceed the modified tracks processed threshold 408, then control proceeds to block 516 to access the next track in the active LRU cache list $200_A$ to process.

With the operations of FIG. 5, if the threshold number of modified tracks are processed, then the demote scan task 126 may use the cursor 404 to proceed to a region of unmodified tracks identified by the cursor 404 to avoid continuing to process modified tracks, which are not eligible for being moved to the demote ready LRU list $200_{DR}$. The cursor 404 may represent an unmodified track resulting from a destage operation initiated at block 518 during a previous scan. In this way, the demote scan task 126 will process only a limited number of modified tracks before skipping to a region of unmodified tracks which are eligible to be moved to the demote ready LRU list $200_{DR}$.

In the described embodiments of FIG. 5, the demote scan task 126 initiates a destage by indicating the unmodified track on the demote ready LRU list $200_{DR}$. In an alternative embodiment, the demote scan task 126 may initiate a demote operation by performing the demote operation, i.e., removing from cache or invalidating the track, without using a demote ready LRU list $200_{DR}$.

Unmodified tracks at the LRU end 204 on the demote ready LRU list $200_{DR}$ are demoted, i.e., removed or invalidated in the cache 116, by a separate demote process executed by the processor 112. If a track indicated on the demote ready LRU list $200_{DR}$ is accessed, then that track may be moved to the MRU end 202 of the active LRU cache list $200_A$.

Figure 6:
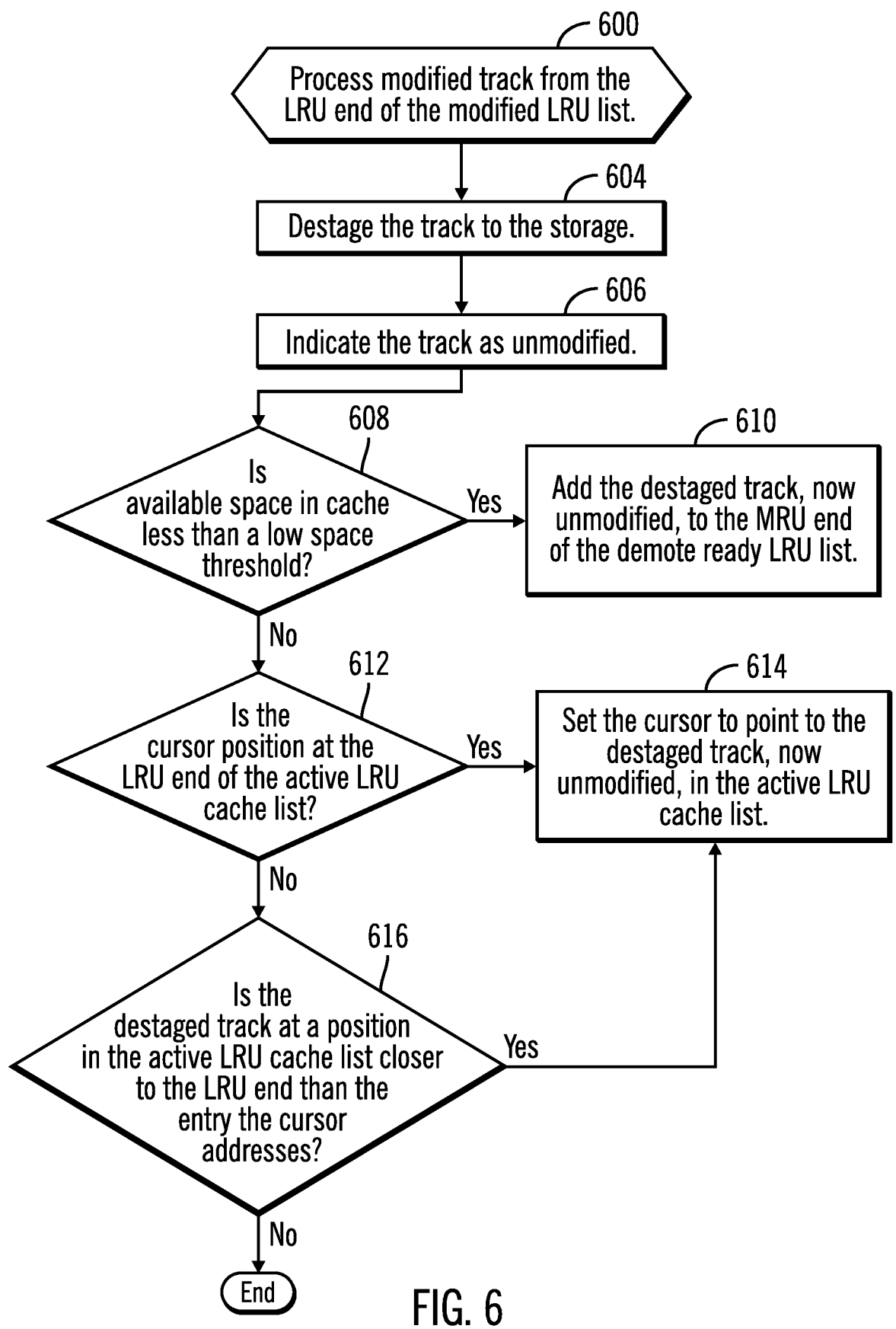
FIG. 6 illustrates an embodiment of operations to process tracks to destage in the cache.

FIG. 6 illustrates an embodiment of operations performed by the destage task 128 executed by the processor 112 to process modified tracks indicated on the modified LRU list $200_M$. The destage task 128 processes (at block 600) a track indicated on the LRU end 204 of the modified LRU list $200_M$ and then initiates the destaging (at block 604) of the modified track to the storage 110. The destaged modified track is indicated (at block 606) as unmodified in the track data type 306. If (at block 608) available space in the cache 116 has fallen below a low space threshold, then the destaged modified track, now unmodified, is added (at block 610) to the MRU end 202 of the demote ready LRU list $200_{DR}$. Otherwise, if (at block 608) the space is not below the low space threshold, then the destage task 128 may leave the now unmodified track in the active LRU cache list $200_A$ to be processed during the next demote scan operation by proceeding to block 612. If (at block 612) the cursor 404 is positioned at the LRU end 204 of the active LRU cache list $200_A$, then the cursor 404 is modified (at block 614) to point to the destaged track, which is now unmodified. If (at block 612) the cursor 404 is somewhere above the LRU end 204 in the active LRU cache list $200_A$, then the destage task 128 determines (at block 616) whether the destaged track is at a position in the active LRU cache list $200_A$ closer to the LRU end 204 than the entry pointed to by the cursor 404. If so, control proceeds to block 614 to move the cursor 404 to the just destaged track. Otherwise, if (at block 616) the cursor is closer to the LRU end 204 than the just destaged track, then control ends and the cursor 404 remains in its current position. In this way, during the next demote scan operation, if the threshold number of modified tracks are processed the demote scan task 126 will jump to the unmodified track resulting from a destage that is closest to the LRU end 204 where the demote scanning will start. This allows the demote scan to process unmodified tracks as early as possible in the active LRU cache list $200_A$.

Described embodiments provide techniques to avoid the demote scan task from processing too many modified tracks without reaching an unmodified track by having the demote scan task skip to an unmodified track in the active cache list after processing a predetermined number of modified tracks. In response to processing an indication of a modified track in the cache list while scanning the cache list, a destage operation for the processed modified track maybe initiated and the demote scan task may continue to scan the cache list to determine unmodified tracks. The determined unmodified track may comprise one of the destaged tracks destaged in response to the initiating the destage operation while performing the demote scan task. In this way, the demote scan task is limited in the number of modified tracks that are processed before moving to a region of unmodified tracks that may be demoted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
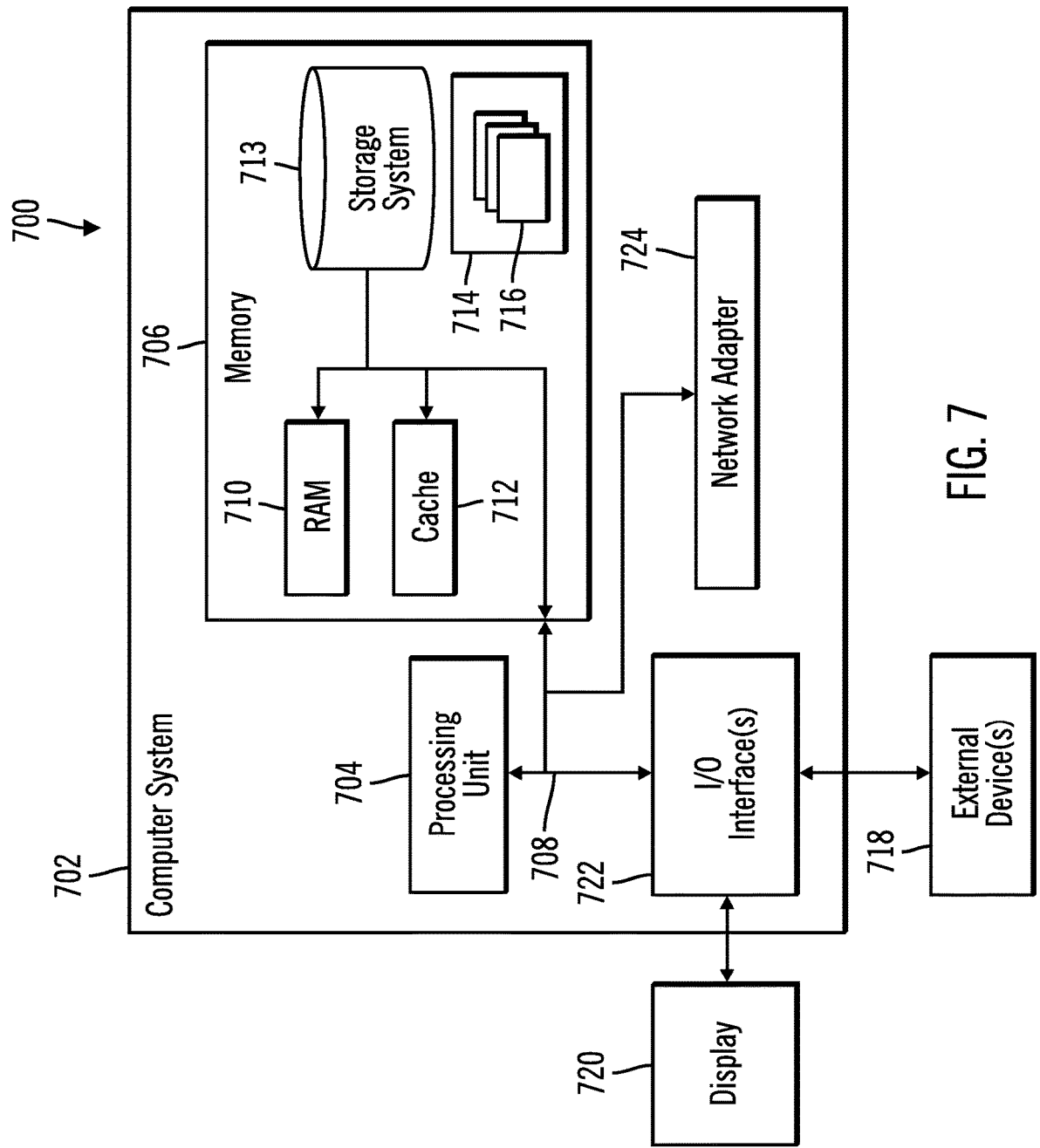
FIG. 7 illustrates a computing environment in which the components of FIG. 1 may be implemented.

The computational components of FIG. 1, including the hosts $102_1, 102_2 \ldots 102_n$ and storage controller 104, may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types.

Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing tracks in a storage in a cache, the computer program product comprising a computer readable storage medium having computer readable program code embodied therein that when executed performs operations, the operations comprising:
  indicating tracks in the storage stored in the cache in a cache list, wherein the cache list comprises an ordered list from a most recently used (MRU) end to a least recently used (LRU) end;
  scanning the cache list from the LRU end to determine unmodified tracks to demote;
  in response to processing a track in the cache list indicated as modified while scanning the cache list, initiating a destage of the processed track;
  in response to processing a threshold number of a consecutive plurality of modified tracks indicated in the cache list, scanning the cache list from a cursor to demote the unmodified tracks in a region of unmodified tracks;
  in response to completing the destaging of the processed track, determining whether an entry in the cache list for the processed track is closer to the LRU end of the cache list than an unmodified track addressed by the cursor; and
  setting the cursor to point to the processed track in the cache list comprising a start of the region of unmodified tracks in the cache list in response to the determining that the processed track is closer to the LRU end than the unmodified track addressed by the cursor.

2. The computer program product of claim 1, wherein the start of the region of unmodified tracks comprises one of a plurality of destaged tracks destaged in response to the initiating the destage.

3. The computer program product of claim 1, wherein the threshold number comprises a predetermined number used during each instance of scanning the cache list.

4. The computer program product of claim 1, wherein the cursor remains pointing to the unmodified track addressed by the cursor in response to the determining that the processed track is closer to the MRU end than the unmodified track addressed by the cursor.

5. The computer program product of claim 1, wherein the operations further comprise:
  setting the cursor to point to an entry at the LRU end of the cache list in response to beginning a scanning of the cache list;
  in response to completing the destaging of the processed track in response to the initiating the destage, determining whether the cursor addresses the entry at the LRU end of the cache list; and
  setting the cursor to point to the processed track in response to the cursor pointing to the entry at the LRU end of the cache list, wherein the determining whether the entry in the cache list for the processed track is closer to the LRU end of the cache list is performed in response to the cursor pointing to an entry in the cache list not comprising the entry at the LRU end of the cache list.

6. The computer program product of claim 1, wherein the operations further comprise:
  in response to completing the destaging of the processed track in response to the initiating the destage, determining whether available space in the cache is below a space threshold; and
  imitating to demote the processed track in response to determining that the available space in the cache is below the space threshold.

7. The computer program product of claim 1, wherein the initiating the destage comprises:
  indicating the processed track at an MRU end of a modified list of modified tracks to destage, wherein the modified tracks are destaged from the LRU end of the modified list.

8. The computer program product of claim 7, wherein the modified tracks in the cache list comprise cache fast write tracks comprising modified tracks written to the cache without also being written to a non-volatile memory device, wherein there is one modified list of modified tracks to destage for each of a plurality of Redundant Array of Independent Disk (RAID) ranks in the storage in which the tracks are stored, wherein the modified track is indicated in the modified list for the RAID rank in the storage in which the track is stored.

9. The computer program product of claim 1, wherein the initiating to demote the processed track comprises indicating the processed track in a demote ready list and removing from the indication of the processed track from the cache list, wherein tracks indicated in the demote ready list are demoted from the cache.

10. A system for managing tracks in a storage, comprising:
  a processor;
  a memory including a cache;
  a computer readable storage medium having computer readable program code embodied therein that when executed performs operations, the operations comprising:
    indicating tracks in the storage stored in the cache in a cache list, wherein the cache list comprises an ordered list from a most recently used (MRU) end to a least recently used (LRU) end;
    scanning the cache list from the LRU end to determine unmodified tracks to demote;
    in response to processing a track in the cache list indicated as modified while scanning the cache list, initiating a destage of the processed track;
    in response to processing a threshold number of a consecutive plurality of modified tracks indicted in the cache list, scanning the cache list from a cursor to demote the unmodified tracks in a region of unmodified tracks;
    in response to completing the destaging of the processed track, determining whether an entry in the cache list for the processed track is closer to the LRU end of the cache list than an unmodified track addressed by the cursor; and
    setting a cursor to point to the processed track in the cache list comprising a start of the region of unmodified tracks in the cache list in response to the determining that the processed track is closer to the LRU end than the unmodified track addressed by the cursor.

11. The system of claim 10, wherein the start of the region of unmodified tracks comprises one of a plurality of destaged tracks destaged in response to the initiating the destage.

12. The system of claim 10, wherein the operations further comprise:
  setting the cursor to point to an entry at the LRU end of the cache list in response to beginning a scanning of the cache list;

in response to completing the destaging of the processed track in response to the initiating the destage, determining whether the cursor addresses the entry at the LRU end of the cache list; and setting the cursor to point to the processed track in response to the cursor pointing to the entry at the LRU end of the cache list, wherein the determining whether the entry in the cache list for the processed track is closer to the LRU end of the cache list is performed in response to the cursor pointing to an entry in the cache list not comprising the entry at the LRU end of the cache list.

13. A method for managing tracks in a storage in a cache, comprising:

indicating tracks in the storage stored in the cache in a cache list, wherein the cache list comprises an ordered list from a most recently used (MRU) end to a least recently used (LRU) end;

scanning the cache list from the LRU end to determine unmodified tracks to demote;

in response to processing a track in the cache list indicated as modified while scanning the cache list, initiating a destage of the processed track;

in response to processing a threshold number of a consecutive plurality of modified tracks indicted in the cache list, scanning the cache list from a cursor to demote the unmodified tracks in a region of unmodified tracks;

in response to completing the destaging of the processed track, determining whether an entry in the cache list for the processed track is closer to the LRU end of the cache list than an unmodified track addressed by the cursor; and setting the cursor to point to the processed track in the cache list comprising a start of the region of unmodified tracks in the cache list in response to the determining that the processed track is closer to the LRU end than the unmodified track addressed by the cursor.

14. The method of claim 13, wherein the start of the region of unmodified tracks comprises one of a plurality of destaged tracks destaged in response to the initiating the destage.

15. The method of claim 13, further comprising:

setting the cursor to point to an entry at the LRU end of the cache list in response to beginning a scanning of the cache list;

in response to completing the destaging of the processed track in response to the initiating the destage, determining whether the cursor addresses the entry at the LRU end of the cache list; and setting the cursor to point to the processed track in response to the cursor pointing to the entry at the LRU end of the cache list, wherein the determining whether the entry in the cache list for the processed track is closer to the LRU end of the cache list is performed in response to the cursor pointing to an entry in the cache list not comprising the entry at the LRU end of the cache list.

* * * * *